Figure 1:
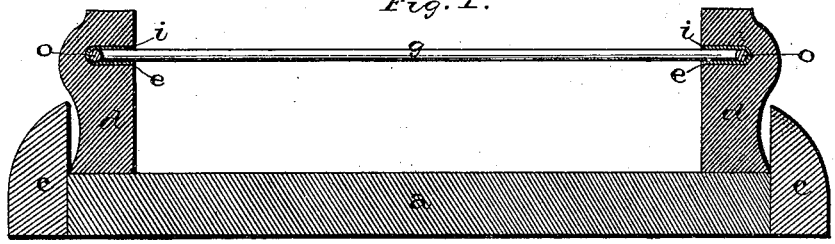
Figure 2:
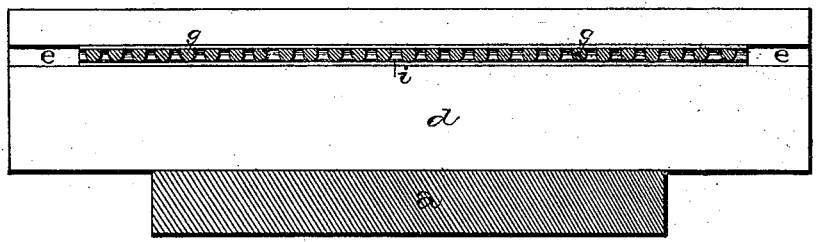
Figure 3:
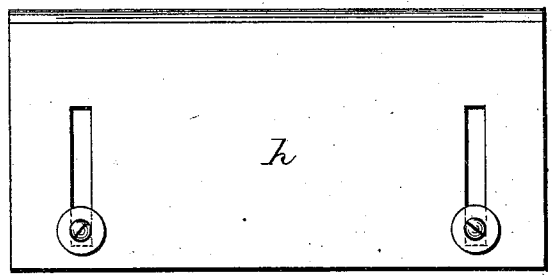
Figure 4:
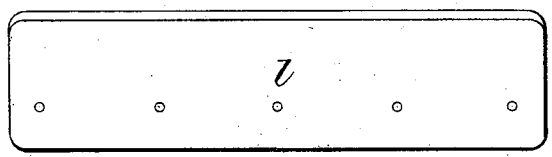
Figure 5:

H. B. RORKE.
PLAITING-MACHINE.

No. 193,131. Patented July 17, 1877.

WITNESSES
J. Wm. Garner
Albert J. de Geys

INVENTOR
H. B. Rorke
per
F. A. Lehmann, Atty

UNITED STATES PATENT OFFICE.

HUGH B. RORKE, OF FULTON, NEW YORK.

IMPROVEMENT IN PLAITING-MACHINES.

Specification forming part of Letters Patent No. 193,131, dated July 17, 1877; application filed April 28, 1877.

*To all whom it may concern:*

Be it known that I, HUGH B. RORKE, of Fulton, in the county of Oswego and State of New York, have invented certain new and useful Improvements in Plaiting-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in plaiting-machines; and it consists in the arrangement and combination of parts that will be more fully described hereinafter.

The accompanying drawings represent my invention.

$a$ represents the ironing-board, which has a cleat, $c$, running along each of its sides, which cleats project a suitable distance above the top of the board, and form supports or braces for the frame $d$. This frame consists of two bars of suitable length, each one of which has a groove, $e$, running from end to end, in which the ends of the plaiting-rods $g$ are held. These rods $g$ may be of any desired thickness, and placed any suitable distance apart, and each one is made flat on one side and half round on the other, so that flat plaits may be made on one side and round fluting on the other. By thus making the rods of this shape both plaiting and fluting may be made on the same machine with equal facility, instead of having to use two separate machines or devices for these purposes. The end of each bar is soldered between the sides of a U-shaped plate, $i$, where they are securely held. In order to brace these plates and make them rigid and strong, an iron rod, $o$, is run through them from end to end.

In making the plaits or flutes two knives are used—the one $h$, that is provided with the adjustable blade, and the one $l$, that is provided with the stationary blade and rubber band $n$. The knife $l$, with its rubber band $n$, is used as a presser, and serves to hold the material that is being plaited in position, and keep it from slipping while new plaits or flutes are being made. Where some device is not used for holding the goods so that it cannot slip, it is found that, owing to the constant slipping, the plaits and flutes are of an unequal length, and that if neat work is to be done, all must be of the same size.

Instead of this rubber any other material or device that will answer the same purpose may be used, as the only object is to hold the goods in place.

After the plaits or flutes have all been formed, the plaiting-rods can be removed from the side bars $d$, the ironing-board turned over on its face, and then the plaits ironed down flat.

Having thus described my invention, I claim—

1. The plaiting and fluting rods $g$, made flat on one side and half round on the other, substantially as shown.

2. The rods $g$, in combination with the U-shaped plates $i$ and rods $o$, substantially as set forth.

3. The holding or pressing device $l$, provided with the rubber $n$, or its equivalent, substantially as specified.

In testimony that I claim the foregoing I have hereunto set my hand and seal this 23d day of April, 1877.

HUGH B. RORKE. [L. S.]

Witnesses:
 MELVIN T. STEPHENS,
 OLIVER YOUMANS.